United States Patent [19]

Taramasso, deceased et al.

[11] Patent Number: 4,687,654

[45] Date of Patent: Aug. 18, 1987

[54] PROCESS FOR PREPARING ZSM-5, LARGE PORE MORDENITE AND ZSM-35

[75] Inventors: Marco Taramasso, deceased, late of S. Donato Milanese, by Irene Gatti, heir; Bruno Notari; Giovanni Manara, both of S. Donato Milanese; Giuseppe Bellussi, Piacenza, all of Italy

[73] Assignee: Snamprogetti, S.p.A., Milan, Italy

[21] Appl. No.: 762,567

[22] Filed: Aug. 5, 1985

Related U.S. Application Data

[63] Continuation of Ser. No. 508,554, Jun. 28, 1983, abandoned.

[30] Foreign Application Priority Data

Jul. 1, 1982 [IT]  Italy ................................ 22176 A/82

[51] Int. Cl.$^4$ ............................................. C01B 33/28
[52] U.S. Cl. .................................... 423/329; 423/328; 423/330; 502/60; 502/77; 502/78
[58] Field of Search ................................ 423/328–330; 502/60, 77, 78

[56] References Cited

U.S. PATENT DOCUMENTS

| 3,130,007 | 4/1964 | Breck | 423/329 X |
| 3,701,629 | 10/1972 | Maness | 423/329 |
| 4,139,600 | 2/1979 | Rollman et al. | 423/328 |
| 4,175,114 | 11/1979 | Plank et al. | 423/328 |
| 4,257,885 | 3/1981 | Grose et al. | 423/328 X |
| 4,275,047 | 6/1981 | Whittam | 423/329 |
| 4,285,922 | 8/1981 | Audeh et al. | 423/329 |
| 4,452,907 | 6/1984 | Ball et al. | 423/328 X |

OTHER PUBLICATIONS

Paper No. 9 of 06/063,961 the Patented File of Grose et al, 4,257,885.

Primary Examiner—John Doll
Assistant Examiner—Jackson Leeds
Attorney, Agent, or Firm—Hedman, Gibson, Costigan & Hoare

[57] ABSTRACT

A process for preparing porous crystalline alumino-silicates consisting of bringing into contact, in an aqueous environment, sodium silicate with an aluminum derivative at a molar $SiO_2/Al_2O_3$ ratio greater than or equal to 8, in the presence of one or more alkaline hydroxides at a molar $Me^+/SiO_2$ ratio greater than 0.6, where $Me^+$ represents the alkaline metal or metals, and in the presence of a mineralizing agent, operating at a temperature of between 20° and 100° C., and controlling the molar $OH^-/SiO_2$ ratio of the resultant mixture at a value of 0.01 and 0.8, the resultant mixture being crystallized at said molar $OH^-/SiO_2$ ratio in a closed environment for a period of between some hours and 40 days at a temperature of between 100° and 200° C.

14 Claims, No Drawings

PROCESS FOR PREPARING ZSM-5, LARGE PORE MORDENITE AND ZSM-35

CROSS-REFERENCE TO RELATED APPLICATION

This is a continuation of application Ser. No. 508,554, filed June 28, 1983, abandoned.

BACKGROUND OF THE INVENTION

1. Field of the Invention

This invention relates to a process for preparing porous crystalline alumino-silicates (zeolites).

More specifically, the invention relates to a process for preparing porous crystalline alumino-silicates of high silica/alumina ratio, in an inorganic environment.

2. Description of the Prior Art

Zeolites having a $SiO_2/Al_2O_3$ ratio of about 10 or greater are notably characterized by high thermal stability, which allows them considerable variety of application.

Such zeolites are mainly characterised, at least in the case of known structures, by structural sub-units composed of rings of 5 tetrahedra, such as the zeolites of the mordenite family, which includes ferrierite, dachiardite, epistilbite and bikitaite. On the other hand by means of the template action of organic substances, preferably tetraalkylammonium derivatives, but also alcohols, ethers and amines, it is possible to obtain special zeolites. Of this family, the most known is ZSM 5, which also contains rings of 5 tetrahedra. Analogous zeolite structures have been obtained by varying the nature of the template (Nu 1, ZSM 35, ASM 11, ZSM 12 etc.).

Purely siliceous structures have been obtained by action of the tetraalkylammonium template (silicalite 1, silicalite 2 and analogues) where the use of a purely inorganic system would have led to the formation of quartz or metastable crystalline silicas, such as silica $\chi$, which then evolve into quartz. An attempt to substantially reduce the quantity of tetraalkylammonium cation in the synthesis of ZSM 5 and ZSM 11 zeolites has been made using mixtures of ammonium hydroxide and/or alcohols in the presence of nuclei of the zeolite which it is required to produce.

The need to use crystallization nuclei is, however, a process complication, in that such nuclei must be chosen carefully with regard to their dimensions and quantity.

In European patent application No. 30811 a process has been proposed for the synthesis of zeolite alumino-silicates with a molar silica/alumina ratio greater than 12 without using organic compounds such as alcohols, tetraalkylammonium ions or alkylene oxides. Ammonia, ammonium hydroxides or ammonium salts are used in order to obtain the formation of the required zeolite.

Finally, U.S. Pat. No. 4,257,885 describes a new synthetic zeolite prepared in the absence of organic substances or ammoniacal substances, using colloidal silica as the silicon source.

SUMMARY OF THE INVENTION

It has now been unexpectedly found possible to synthesize zeolite alumino-silicates of high silica content by using a low-cost material, namely sodium silicate, as the silicon source, in the absence both of organic substances and of ammonia or ammoniacal substances.

The present invention enables the required type of zeolite to be produced by controlling certain critical factors, including naturally the $SiO_2/Al_2O_3$ ratio, which in the reaction mixture must not be less than 8.

It has also been surprisingly found that the zeolite structure can be influenced by suitably controlling, before crystallizing the resultant mixture, the molar ratio (indicated by $OH^-/SiO_2$) of the hydroxyl concentration (determined by simple titration) to the silica.

DETAILED DESCRIPTION OF THE INVENTION

In particular, the zeolites obtainable by the process according to the present invention are those known by the name of large-pore mordenite of high silica content, and those having structures of ZSM 5 and ZSM 35 type, or ferrierite. ZSM 5 and ZSM 35 zeolites are described in U.S. Pat. Nos. 3,702,886 and 4,014,245 of Mobil Oil respectively.

The characteristics of the products obtained by the process according to the invention are described hereinafter.

In its anhydrous state, large-pore mordenite is of formula:

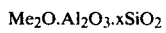

$$Me_2O.Al_2O_3.xSiO_2$$

where Me is an alkaline metal and x varies between 10 and 20, and preferably around 18.

When in the anhydrous state, ZSM 5 zeolite is of formula:

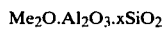

$$Me_2O.Al_2O_3.xSiO_2$$

where Me is an alkaline metal and x varies within a fairly narrow range, between 20 and 40, and is preferably maintained around 25.

When in the anhydrous state, ZSM 35 zeolite is of formula:

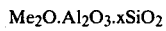

$$Me_2O.Al_2O_3.xSiO_2$$

where Me is an alkaline metal and x varies within a fairly narrow range, between 10 and 30, and is preferably maintained around 17.

The process according to the present invention consists of bringing into contact, in an aqueous environment, sodium silicate with an aluminum derivative at a molar $SiO_2/Al_2O_3$ ratio greater than or equal to 8, in the presence of one or more alkaline hydroxides at a molar $Me^+/SiO_2$ ratio greater than 0.6, where $Me^+$ represents the alkaline metal or metals, in the presence of mineralizing agent, operating at a temperature of between 20° and 100° C., controlling the molar $OH^-/SiO_2$ ratio of the resultant mixture at a value of between 0.01 and 0.8, the resultant mixture being crystallized at said molar $OH^-/SiO_2$ ratio in a closed environment for a period of between some hours and 40 days, at a temperature of between 100° and 200° C.

The aluminum derivative is preferably chosen from sodium aluminate, aluminum sulphate, aluminum chloride and alumina trihydrate.

The mineralizing agents, present in the mother liquors, enable the crystallization time to be shortened. These agents can be preferably chosen from sodium sulphate, potassium sulphate, sodium phosphate, potassium phosphate, sodium chloride and potassium chloride.

It should be noted that the synthesis methods according to the present invention, in contrast to the conventional methods for ZSM 5 and ZSM 35 zeolites, show little dependence on the nature and dimension of the cation, and can be carried out in systems containing lithium, sodium or potassium cations, or mixtures thereof.

The molar ratios of the reagents for preparing large-pore mordenite according to the process of the invention are given in Table 1.

TABLE 1

| Molar ratio | Wide Range | Preferred Range |
|---|---|---|
| $SiO_2/Al_2O_3$ | 10–200 | 15–100 |
| $Me^+/SiO_2$ | >0.6 | 0.66–0.96 |
| $H_2O/SiO_2$ | 10–100 | 20–40 |
| $OH^-/SiO_2$ | 0.2–0.80 | 0.25–0.50 |

The molar ratios of the reagents for preparing ZSM 5 zeolite according to the process of the invention are given in Table 2.

TABLE 2

| Molar ratio | Maximum | Preferred |
|---|---|---|
| $SiO_2/Al_2O_3$ | 20–50 | 25–40 |
| $Me^+/SiO_2$ | >0.6 | 0.66–0.96 |
| $H_2O/SiO_2$ | 20–100 | 30–50 |
| $OH^-/SiO_2$ | 0.05–0.30 | 0.10–0.20 |

The molar ratios of the reagents for preparing zeolite similar to ZSM 35 according to the process of the invention are given in Table 3.

TABLE 3

| Molar ratio | Maximum | Preferred |
|---|---|---|
| $SiO_2/Al_2O_3$ | 8–25 | 10–20 |
| $Me^+/SiO_2$ | >0.6 | 0.66–0.96 |
| $H_2O/SiO_2$ | 20–100 | 40–80 |
| $OH^-/SiO_2$ | 0.01–0.25 | 0.05–0.12 |

In the three tables, the reagents based on silicon and aluminum are expressed as oxides.

The zeolites obtained by the synthesis method according to the present invention do not differ structurally from those obtained by conventional synthesis methods.

Zeolites synthesized in an inorganic environment without the use of ammoniacal compounds according to the present invention can be converted into acid form or exchanged with various cations, and can be used in all the applications of the corresponding zeolites prepared by conventional methods.

The significance of the present invention will be better illustrated by some preparation examples, which are not to be considered as limitative of the invention itself.

DESCRIPTION OF THE SPECIFIC EMBODIMENTS

Examples 1–14

The reaction mixture is prepared from sodium silicate (26.03 weight% $SiO_2$; 8.97 weight% $Na_2O$; 65 weight% $H_2O$) and from aluminum sulphate $Al_2(SO_4)_3 \cdot 16H_2O$ ($Al_2O_3 = 17$ weight%).

The sodium silicate is dissolved in distilled water containing the required quantity of NaOH to obtain the required $OH^-/SiO_2$ ratio, and the aluminum sulphate is separately dissolved in water (possibly containing sulphuric acid).

The second solution is added to the first under vigorous agitation, and the mixture heated to 80° C.

The gel obtained in this manner is transferred to an autoclave and kept at a temperature of 176° C. under agitation.

The reagent composition, the crystallization time and the nature of the zeolite produced are given in Table 4. The molar $SiO_2/Al_2O_3$ ratios of the mordenites obtained vary between 16 and 19. In all the described examples, the salt added as mineralizing agent is sodium sulphate, but in Example 8 a mixture of sodium and potassium is used.

In Examples 1, 3 and 5, the addition of different zeolite nuclei equally gave rise to the formation of mordenite, whereas in Example 8 mordenite nuclei were added.

In all cases the zeolite obtained is that corresponding to the $OH^-/SiO_2$ ratio, and not that corresponding to the nuclei.

Examples 15–18

The procedure of the preceding examples is followed, the silica and alumina sources being sodium silicate and aluminum sulphate (Examples 15, 16, 17), or sodium silicate, aluminum chloride and hydrochloric acid (Example 18).

The considerably longer crystallization time of the zeolite of Example 18 is due to the presence of $Cl^-$ instead of $SO_4^{--}$.

The reagent composition, the crystallization time and the nature of the zeolite produced are given in Table 5. The molar $SiO_2/Al_2O_3$ ratios of the ZSM 5 zeolites produced vary between 24 and 27.

Example 19

Following the procedure of Example 1, sodium silicate is dissolved in distilled water containing the necessary quantity of NaOH, and the aluminum sulphate is dissolved separately in water and sulphuric acid.

The molar ratios of the reagents are as follows:

| $SiO_2Al_2O_3$ | $Na^+/SiO_2$ | $H_2O/SiO_2$ | $SO_4^{--}/SiO_2$ | $OH^-/SiO_2$ |
|---|---|---|---|---|
| 18 | 0.71 | 80 | 0.22 | 0.094 |

After being kept for 72 hours under agitation at 80° C., the reaction mixture is transferred to an autoclave and kept at 150° C. for 39 days.

On X-ray analysis, the product is found to consist of ferrierite or ZSM 35. The molar $SiO_2/Al_2O_3$ ratio of the zeolite produced is 17.

TABLE 4

| Example No. | Molar ratio of reagents $SiO_2/Al_2O_3$ | $Na^+/SiO_2$ | $H_2O/SiO_2$ | $SO_4^{--}/SiO_2$ | Others g/mole $SiO_2$ | $OH^-/SiO_2$ | Cryst. time days | Product obtained |
|---|---|---|---|---|---|---|---|---|
| 1 | 15 | 0.95 | 71 | 0.25 | ZSM35 nuclei 0.25 | 0.274 | 7 | Pure mordenite |
| 2 | 15 | 0.86 | 33 | 0.20 | — | 0.260 | 8 | Pure mordenite |
| 3 | 15 | 0.86 | 33 | 0.21 | ZSM35 nuclei | 0.260 | 9 | Pure mordenite |

TABLE 4-continued

| Example No. | Molar ratio of reagents | | | | Others g/mole $SiO_2$ | $OH^-/SiO_2$ | Cryst. time days | Product obtained |
|---|---|---|---|---|---|---|---|---|
| | $\frac{SiO_2}{Al_2O_3}$ | $\frac{Na^+}{SiO_2}$ | $\frac{H_2O}{SiO_2}$ | $\frac{SO_4^{--}}{SiO_2}$ | | | | |
| 4 | 25 | 0.96 | 38 | 0.21 | — | 0.373 | 6 | Pure mordenite |
| 5 | 25 | 0.96 | 38 | 0.21 | ZSM5 nuclei 0.25 | 0.399 | 6 | Pure mordenite |
| 6 | 30 | 0.96 | 55.5 | 0.182 | — | 0.461 | 6 | Mordenite + analcime traces |
| 7 | 30 | 0.89 | 70 | 0.182 | — | 0.382 | 6 | Mordenite + quartz traces |
| 8 | 30 | 0.81[a] | 70 | 0.182 | — | 0.295 | 6 | Mordenite + quartz traces |
| 9 | 30 | 0.81 | 50 | 0.182 | mordenite nuclei 0.50 | 0.234 | 6 | Mordenite + quartz traces |
| 10 | 40 | 0.71 | 33 | 0.105 | — | 0.346 | 6 | Pure mordenite |
| 11 | 50 | 0.76 | 33 | 0.100 | — | 0.425 | 6 | Pure mordenite |
| 12 | 60 | 0.71 | 33 | 0.082 | — | 0.400 | 6 | Pure mordenite |
| 13 | 100 | 0.86 | 33 | 0.104 | — | 0.532 | 6 | Pure mordenite |
| 14 | 100 | 0.86 | 33 | 0.104 | — | 0.516 | 6 | Mordenite + silica traces |

[a] Na = 0.67:K = 0.14

TABLE 5

| Example No. | Composition of reaction mixture | | | | Others g/mole $SiO_2$ | $OH^-/SiO_2$ | Cryst. time days | Product obtained |
|---|---|---|---|---|---|---|---|---|
| | $R\frac{SiO_2}{Al_2O_3}$ | $R\frac{Na^+}{SiO_2}$ | $R\frac{H_2O}{SiO_2}$ | $R\frac{X}{SiO_2}$ | | | | |
| 15 | 30 | 0.74 | 90 | 0.224[a] | — | 0.178 | 6 | ZSM5 + mordenite traces |
| 16 | 35 | 0.66 | 90 | 0.223[a] | — | 0.100 | 14 | ZSM5 + mordenite traces |
| 17 | 40 | 0.67 | 39 | 0.160[a] | — | 0.200 | 11 | Pure ZSM5 |
| 18 | 40 | 0.67 | 69 | 0.390[b] | — | 0.104 | 21 | Pure ZSM5 |

[a] $X = SO_4^{--}$
[b] $X = Cl^-$

We claim:

1. A process for preparing porous crystalline aluminosilicates said process consisting of the steps of:
   (a) bringing into contact, in an aqueous environment and in the absence of organics, ammonia and ammoniacal substances, sodium silicate with an aluminum derivative at a molar $SiO_2/Al_2O_3$ ratio greater than or equal to 8, in the presence of one or more alkaline hydroxides at a molar $Me^+/SiO_2$ ratio greater than 0.6, where $Me^+$ represents the alkaline metal or metals, and in the presence of a mineralizing agent selected from the group consisting of sodium sulphate, potassium sulphate, sodium phosphate, potassium phosphate, sodium chloride and potassium chloride, and
   (b) conducting the reaction at a temperature between 20° and 100° C. while controlling the molar $OH^-/SiO_2$ ratio of the reaction mixture between 0.01 and 0.8, the resulting mixture being crystallized at said molar ratio of $OH^-/Si_2$ in a closed environment for a period of between several hours and 40 days at a temperature between 100° and 200° C.

2. A process for preparing porous crystalline alumino-silicates as claimed in claim 1, wherein the molar $Me^+/SiO_2$ ratio lies between 0.66 and 0.96.

3. A process for preparing porous crystalline alumino-silicates as claimed in claim 1, wherein the molar $SiO_2/Al_2O_3$ ratio lies between 10 and 200, and the molar $OH^-/SiO_2$ ratio lies between 0.2 and 0.8.

4. A process for preparing porous crystalline alumino-silicates as claimed in claim 1, wherein the molar $SiO_2/Al_2O_3$ ratio lies between 20 and 50, and the molar $OH^-/SiO_2$ ratio lies between 0.05 and 0.30.

5. A process for preparing porous crystalline alumino-silicates as claimed in claim 1, wherein the molar $SiO_2/Al_2O_3$ ratio lies between 8 and 25, and the molar $OH^-/SiO_2$ ratio lies between 0.01 and 0.25.

6. A process as claimed in claim 1, wherein the crystallization temperature lies between 150° and 180° C.

7. A process as claimed in claim 1, wherein the alkaline hydroxides are selected from the group consisting of LiOH, NaOH and KOH.

8. A process as claimed in claim 1, wherein the aluminum derivative is selected from the group consisting of sodium aluminate, aluminum sulphate, aluminum chloride and alumina trihydrate.

9. A process as defined in claim 1 wherein ZSM-5 is prepared by using an $SiO_2/Al_2O_3$ ratio of 20-50; an $Me^+/SiO_2$ ratio of $>0.6$; a $H_2O/SiO_2$ ratio of 20-100 and an $OH^-/SiO_2$ ratio of 0.05-0.30.

10. A process as defined in claim 9 wherein the ratios of $SiO_2/Al_2O_3$ are 25-40; $Me^+/SiO_2$ are 0.66-0.96; $H_2O/SiO_2$ are 30-50; and $OH^-/SiO_2$ are 0.10-0.20.

11. A process as defined in claim 1 wherein ZSM-35 is prepared by using an $SiO_2/Al_2O_3$ ratios of 8-25; a $Me^+/SiO_2$ ratio of $>0.6$; a $H_2O/SiO_2$ ratio of 20-100; and a $OH^-/SiO_2$ ratio of 0.01-0.25.

12. A process as defined in claim 11 wherein the $SiO_2/Al_2O_3$ ratio is 10-20; the $Me^+/SiO_2$ ratio is 0.66-0.96; the $H_2O/SiO_2$ ratio is 40-80 and the $OH^-/SiO_2$ ratio is 0.05-0.12.

13. A process as defined in claim 1 wherein mordenite is prepared using a $SiO_2/Al_2O_3$ ratio of 10-200; a $Me^+/SiO_2$ ratio of $>0.6$; a $H_2O/SiO_2$ ratio of 10-100; and a $OH^-/SiO_2$ ratio of 0.2-0.80.

14. A process as defined in claim 13 wherein the ratio of $SiO_2/Al_2O_3$ is 15-100; the $Me^+SiO_2$ ratio is 0.66-0.96; the $H_2O/SiO_2$ ratio is 20-40; and the $OH^-/SiO_2$ ratio is 0.25-0.50.

* * * * *